(No Model.) 2 Sheets—Sheet 1.

G. DOOLITTLE & H. D. STANLEY.
MACHINE FOR CONFINING STRANDS.

No. 289,077. Patented Nov. 27, 1883.

Attest:
Walter Fowler
W. T. Haviland

Inventors:
George Doolittle
Henry D. Stanley
By Attys:
Wooster Smith (No Model.) 2 Sheets—Sheet 2.

G. DOOLITTLE & H. D. STANLEY.
MACHINE FOR CONFINING STRANDS.

No. 289,077. Patented Nov. 27, 1883.

Witnesses
S. S. W'm'son
W. T. Haviland

Inventors:
George Doolittle
Henry D. Stanley

Attys.
Wooster Smith

UNITED STATES PATENT OFFICE.

GEORGE DOOLITTLE AND HENRY D. STANLEY, OF BRIDGEPORT, CONN.

MACHINE FOR CONFINING STRANDS.

SPECIFICATION forming part of Letters Patent No. 289,077, dated November 27, 1883.

Application filed April 5, 1883. (No model.)

*To all whom it may concern:*

Be it known that we, GEORGE DOOLITTLE and HENRY D. STANLEY, citizens of the United States, residing at Bridgeport, in the county of Fairfield and State of Connecticut, have invented certain new and useful Improvements in Machines for Confining Strands; and we do hereby declare the following to be a full, clear, and exact description of the invention, such as will enable others skilled in the art to which it appertains to make and use the same.

Our invention relates to certain novel and useful improvements in devices for confining and binding tinsel, wire, or other suitable material to be used as flexible conductors for electrical purposes, and has for its object to provide a machine for such purpose as will produce a conductor more economical and serviceable and in less time than has yet been accomplished; and with these ends in view our invention consists in certain details of construction and combination of elements hereinafter fully and in detail explained, and then specifically designated by the claims.

In order that those skilled in the art to which our invention appertains may more fully understand its construction and operation, we will proceed to describe the same in detail, referring by letter to the accompanying drawings, forming part of this specification, in which—

Figure 1:
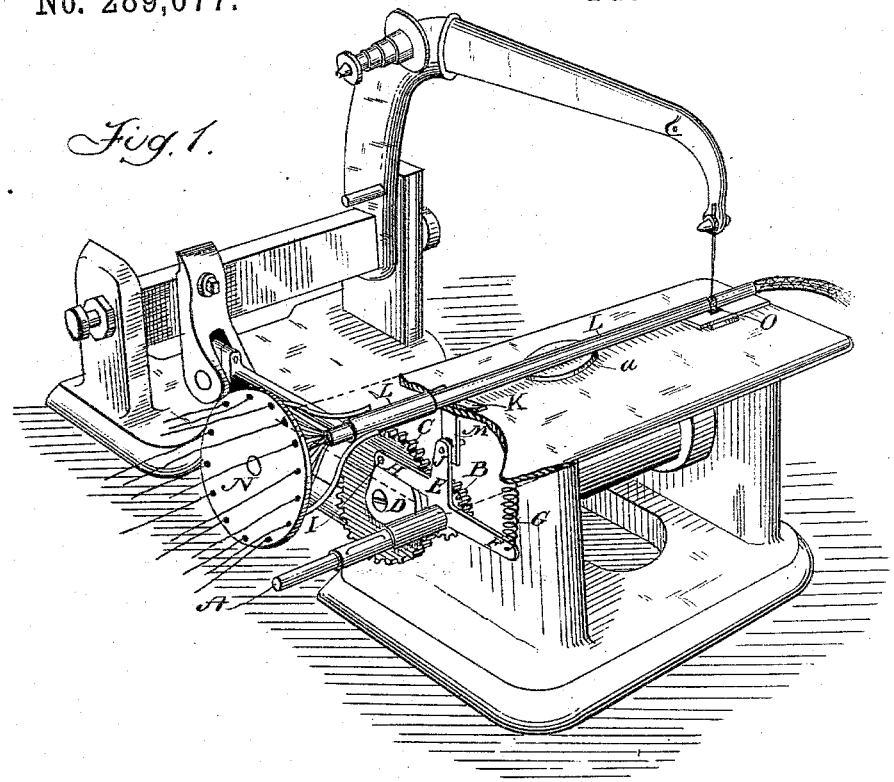
Figure 2:
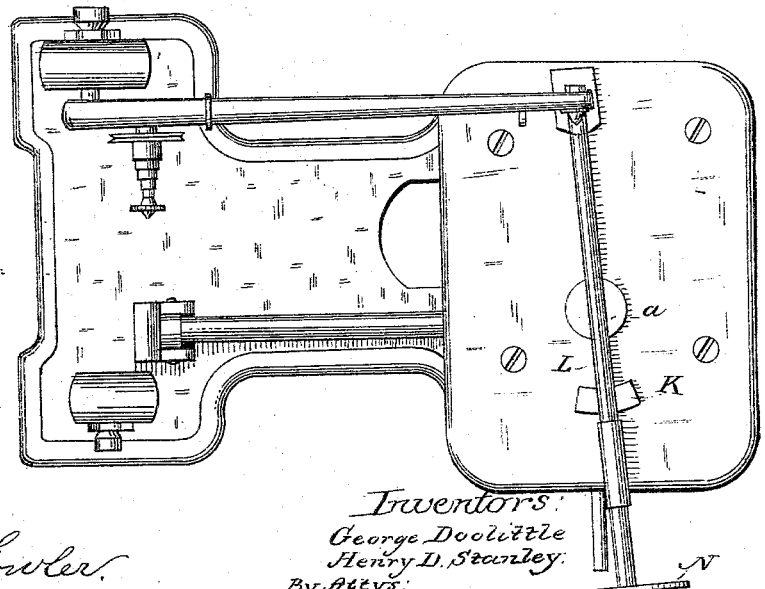
Figure 3:
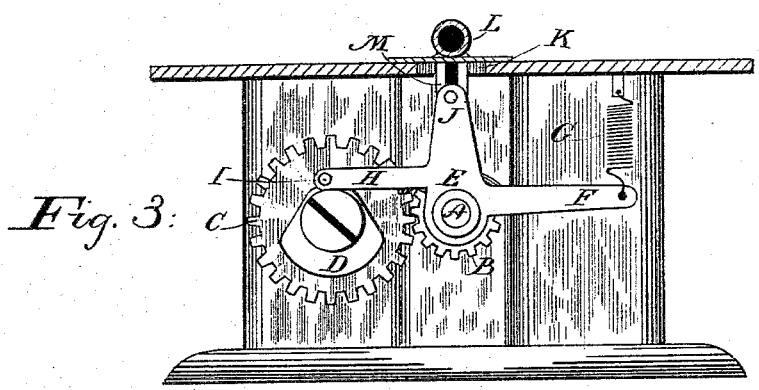
Figure 4:
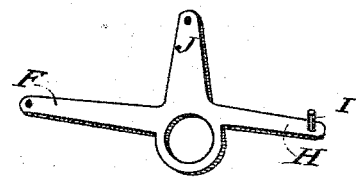

Figure 1 is a perspective view of our improvement with the bed-plate broken away; Fig. 2, a top or plan view; Fig. 3, an end view with the bed-plate and condensing-tube in section; and Fig. 4, a detail view of what will be hereinafter referred to as the "jog-bar."

Similar letters denote like parts in the several figures.

We have shown our device as applied to an ordinary sewing-machine, as best adapted to illustrate the same.

A is the shaft, having cast thereon or rigidly attached thereto a cog-wheel, B, which meshes into another cog, C, pivoted to the frame of the machine. This latter cog-wheel has an eccentric or cam, D, formed integral therewith or secured thereto in any manner, so as to revolve with the same.

E is a jog-bar pivotally attached to the shaft without the wheel B. This bar is connected at one extremity, F, to the bed-plate of the machine by a spring, G, the other end, H, resting against the eccentric or cam D through the medium of a pin, I, or otherwise, and kept in constant contact with said cam, as will be hereinafter explained.

J is an upward projection of the jog-bar, and attached through an opening, K, in the bed-plate to a condensing-tube, L. This tube is of any ordinary shape, and serves merely to keep the strands together, and thereby prevent their displacement before they are confined, in the manner presently explained, and is pivoted to said bed-plate, as seen at *a*, so as to vibrate freely in a horizontal plane, and the opening I is elongated so as to permit a lateral play of the lug M, projecting downward from said tube and connected with the projection J.

It will be readily understood that the spring G serves to keep the pin I in contact with the cam D, and also to return the jog-bar to its normal position, as shown in the drawings, after the action of said cam on the same.

The operation of our improvement is as follows: As the shaft A revolves, the wheel B meshes into the wheel C and causes the cam or eccentric D to revolve. By reason of the contact of the pin I with the latter the extremity H is raised, thereby vibrating the condenser L. As the rotation of the shaft continues the pin will travel along the periphery of the cam and down one of the radial sides thereof, when the action of the spring G will return said extremity H to its normal position, and thereby vibrate the condenser in the opposite direction. The length and contour of the periphery of the cam or eccentric are such that the condenser will remain stationary at the descent of the needle and vibrate on the withdrawal of the latter. In the manufacture of electrical conductors the strands are assembled in a guide-plate, N, which is attached to the condenser, and then passed through the latter until they project beyond the end of the same. If desirable, a central core may be introduced through the central aperture in the guide-plate and the strands congregated around the said core. As the condenser vibrates the needle will descend through the opening O, and, in conjunction with the hook or shuttle, form a stitch or loop at the side of the strands without penetrating the latter. At the withdrawal of the needle the condenser will vibrate, and the thread or other material used in confining the strands will at the next descent of the needle be carried by the latter over the top, and by the hook or shuttle around the bottom of the strands, and the stitch or loop made as before, but at the opposite side of the strands. The feeding of the strands may be accomplished by any well-known means; but we preferably use a pair of rollers operated and timed by the revolution of the shaft of our machine.

Instead of the mechanism shown for vibrating the condenser, an ordinary switch-cam on the shaft of the machine may be used and the condenser connected to the shoe which travels in the cam.

It will be readily understood that any style of condenser, whether open or closed, may be used with equal facility, and that the play or vibration of the forward end may be increased or lessened by simply changing the position of the pivotal point.

We do not wish to confine ourselves to the manufacture of electrical conductors, as our device may be used with equal facility and advantage in confining strands of any material for any purpose.

What we claim as new, and desire to secure by Letters Patent, is—

1. In a machine for condensing and confining strands, the condenser pivoted to the bed-plate of the machine, in combination with means for vibrating the same, whereby the needle descends alternately at each side of the strands, substantially as set forth.

2. In a machine for condensing and confining strands, the condenser pivoted to the bed-plate of the machine and connected to the jog-bar pivotally attached to the shaft and vibrating in a plane at right angles to the same, in combination with mechanism for confining the strands by stitches, substantially as described.

3. The jog-bar pivotally attached to the shaft of the machine and connected at one end by a spring to the bed-plate of the machine, the other extremity being held in constant contact with an eccentric or cam operated by the shaft of the machine, in combination with the condenser pivoted to the bed-plate, substantially as described.

4. The jog-bar pivotally attached to the shaft of the machine, and having laterally-projecting arms F H and upwardly-projecting arm J, in combination with the spring G, eccentric D, and condenser L, substantially as shown and described.

5. The method herein described of making flexible conductors for electrical purposes by condensing the strands of tinsel, wire, or other suitable material parallel to each other, and confining and associating them together by an open net-work of interlocking or interlooping threads, substantially as set forth.

In testimony whereof we affix our signatures in presence of two witnesses.

GEORGE DOOLITTLE.
HENRY D. STANLEY.

A. M. WOOSTER,
W. T. HAVILAND.